Jan. 3, 1939.   A. W. WHEATON   2,142,543
SELECTIVE MULTIPLE FAUCET OR LIKE VALVE
Filed March 29, 1938   3 Sheets-Sheet 1

INVENTOR.
Abram W. Wheaton,
BY George D. Richards
ATTORNEY.

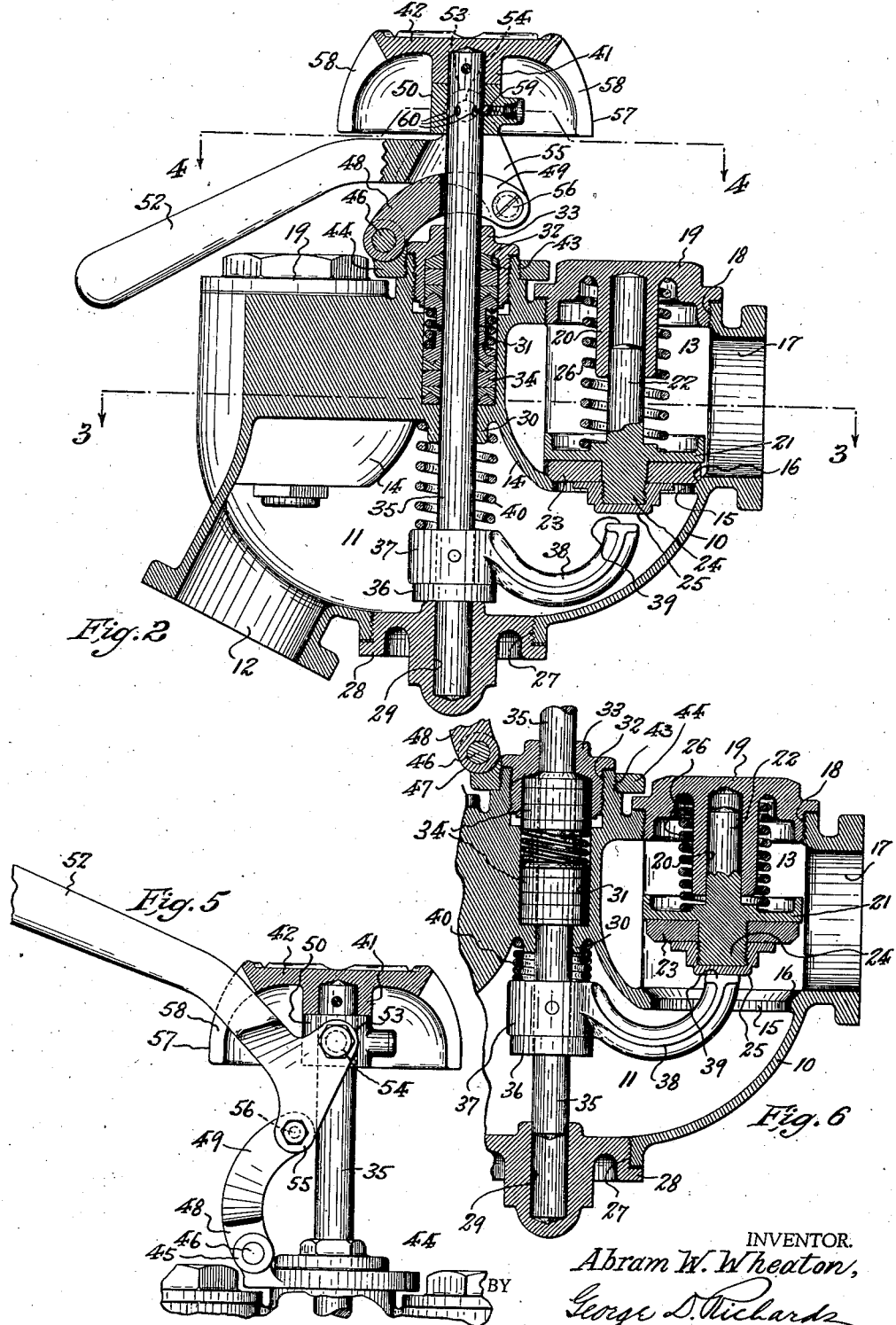

Jan. 3, 1939. A. W. WHEATON 2,142,543
SELECTIVE MULTIPLE FAUCET OR LIKE VALVE
Filed March 29, 1938 3 Sheets-Sheet 3
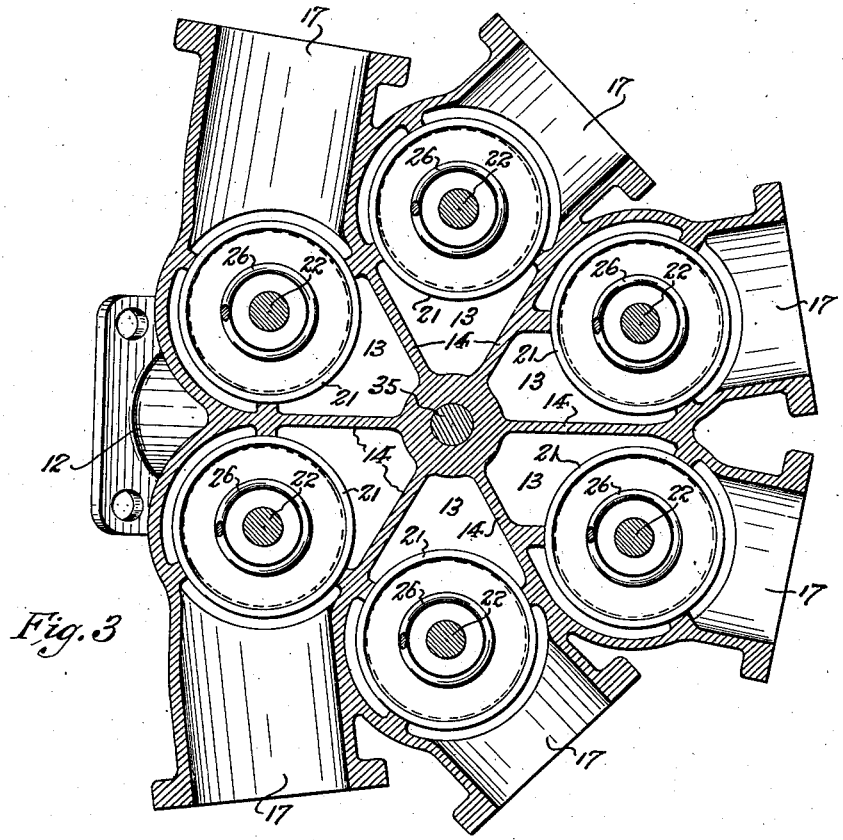
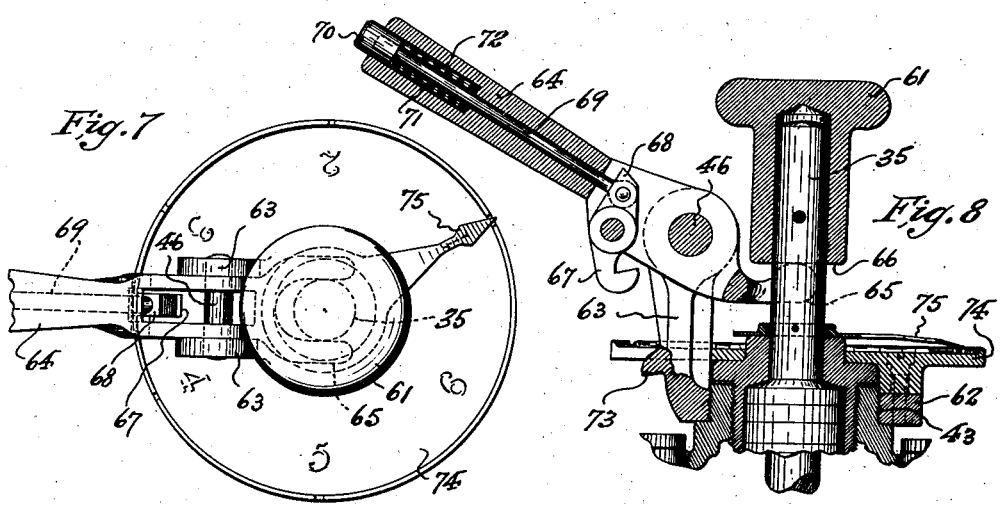
INVENTOR.
Abram W. Wheaton,
BY George D. Richards
ATTORNEY.

Patented Jan. 3, 1939

2,142,543

UNITED STATES PATENT OFFICE 2,142,543

SELECTIVE MULTIPLE FAUCET OR LIKE VALVE

Abram W. Wheaton, Maplewood, N. J., assignor to A. W. Wheaton Brass Works, Newark, N. J., a corporation of New Jersey Application March 29, 1938, Serial No. 198,642

10 Claims. (Cl. 277—57)

This invention relates to a novel selective multiple faucet or like valve; and the invention has reference, more particularly, to a faucet or discharge valve, the intakes of which are respectively adapted to be connected in communication with a plurality of tanks or tank compartments, such, for example, as the several compartments of tank trucks used for transporting various kinds of petroleum products.

This invention has for an object to provide a novel multiple faucet or like valve which is provided with a plurality of intakes, each having its own spring closed valve, and a single outlet or discharge spout, together with a valve actuating means which is selectively movable into operative relation between any given intake valve and the single external lever means by which said actuating means is operated.

Other objects of this invention, not at this time more particularly enumerated, will be understood from the following detailed description of the same.

An illustrative embodiment of the novel multiple faucet or like valve according to this invention is shown in the accompanying drawings, in which:—

Figure 1:
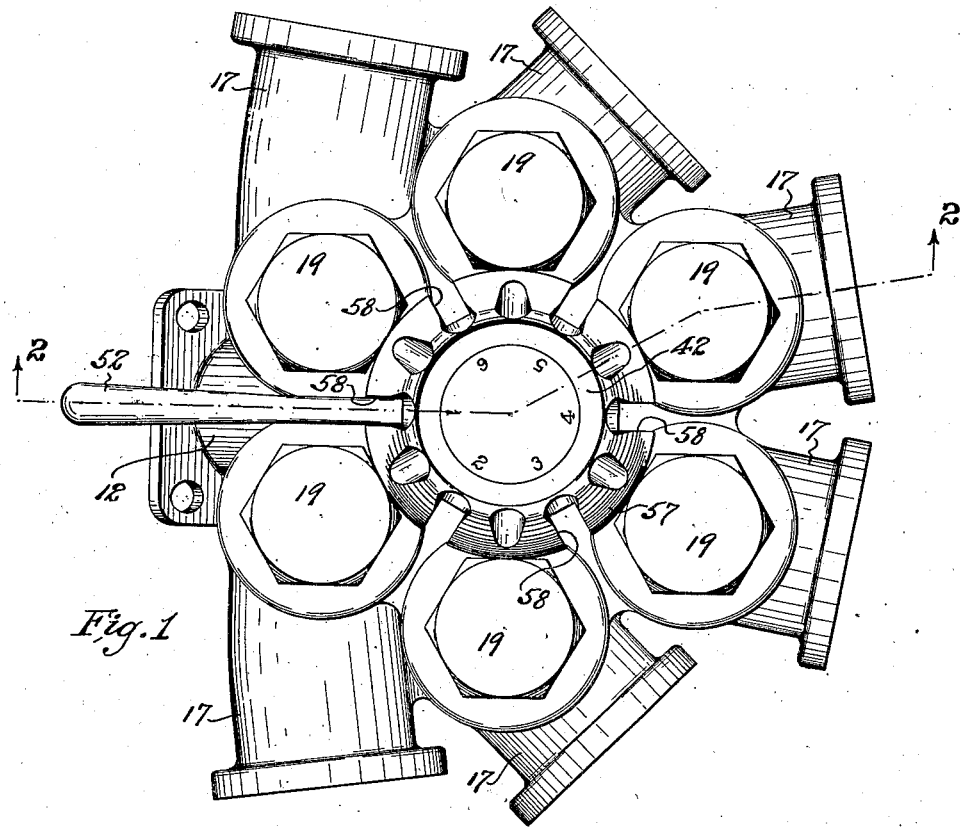
Figure 4:
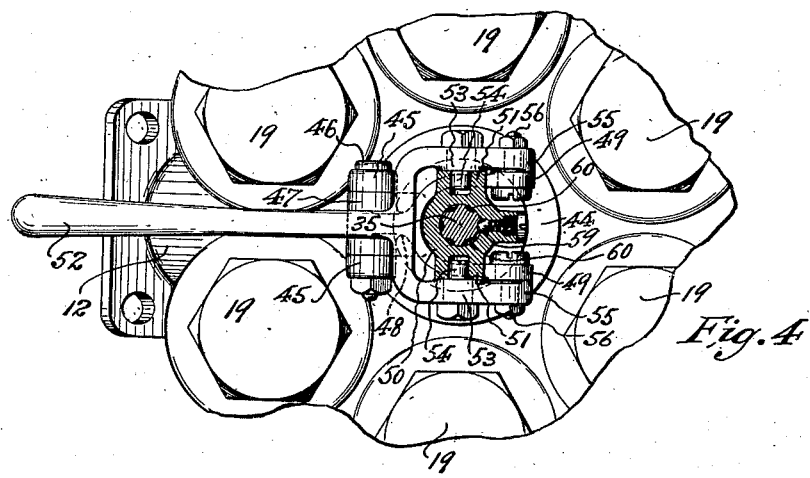

Fig. 1 is a top plan view of the novel multiple faucet or like valve; Fig. 2 is a vertical sectional view thereof, taken on line 2—2 in Fig. 1; Fig. 3 is a horizontal sectional view thereof, taken on line 3—3 in Fig. 2; Fig. 4 is another fragmentary horizontal sectional view thereof, taken on line 4—4 in Fig. 2; Fig. 5 is a fragmentary side elevation in part section showing the valve opening operation of the manipulatable external lever means of the valve actuating means, and Fig. 6 is a fragmentary vertical sectional view showing the operation of the valve actuating means as produced by valve opening operation of the external lever means as shown in Fig. 5.

Fig. 7 is a top plan view, and Fig. 8 is a vertical sectional view, showing a modified form of manipulatable external lever means for controlling the valve actuating means.

Similar characters of reference are employed in the hereinabove described views, to indicate corresponding parts.

Referring to the drawings, the reference character 10 is a valve casing, having a bowl-like outlet chamber 11 in its lower portion from which extends a single outlet or discharge spout 12. Radially offset around the central vertical axis of the valve casing 10 is an annular row of individual intake chambers 13, which are separated one from another by intake chamber walls or partitions 14. These intake chambers 13 are formed in connection with the upper portion of the valve casing 10 with their lower end portions terminating within the outlet chamber 11 and above the bottom thereof. Provided in said lower end portions of the respective intake chambers 13 are valve ports 15 which are bounded by suitable valve seats 16. Extending laterally from each intake chamber 13, in suitable angular exterior projection, is an inlet neck 17. Said inlet necks 17 are adapted to be connected, by suitable conduits (not shown), respectively in communication with the respective tanks or compartments of a tank truck to be served by the novel multiple faucet or valve.

Each valve chamber 13 is provided at its upper end with an internally threaded opening 18 to receive a removable cap 19 from which depends an axial valve guide member 20. Within each valve chamber 13 is a valve member 21 having an upwardly projecting stem 22 to slidably engage with said valve guide member 20. This valve member is provided on its under side with a facing washer 23 of suitable material; the same being adapted to seat upon the cooperating valve seat 16 when the valve member 21 is disposed in closed relation to the port 15. Depending from the under side of the valve member 21 is a threaded stud 24, which extends through the facing washer 23, and onto which is screwed a suitable nut 25 which serves to retain said facing washer 23 in assembled relation to the valve member. Said stud and nut, which project downwardly through the valve port 15, also serve as an abutment means with which a valve opening actuating means may cooperate. The valve member is yieldably held in normal valve port closing position by a compression spring 26 which is arranged between the same and said cap 19.

The casing 10 is provided, in its bottom, with a centrally located internally threaded opening 27 into which is engaged a bottom cap 28. This bottom cap 28 is provided with a centrally disposed outwardly closed but inwardly open bearing portion 29. The casing 10 is further provided, in its upper portion, with a centrally located bearing portion 30, above which is provided a stuffing-box chamber 31, into the upwardly and outwardly open internally threaded end portion 32 of which is engaged a gland 33 which retains within the stuffing-box chamber 31 any suitable form of packing 34, which is preferably, however, of the self-tightening type. Journaled in the bearing portions 29 and 30, for both longitudinal sliding and rotary movement, is an actuator shaft 35, the upper end portion of which extends upwardly through the packed stuffing-box chamber 31 and gland 33 for external projection above the top side of the valve casing 10. Said actuator shaft 35 is disposed along the longitudinal vertical axis of the casing 10 and intermediate the surrounding valve chambers 13. Preferably said actuator shaft 35 is provided, adjacent to its lower end, with a stop collar 36 to normally abut the upper inner end of the bearing portion 29, to thus limit the lowered or normal initial position of the shaft. Affixed to the lower portion of said actuator shaft 35 is the hub 37 of a valve lifter arm 38. Said valve lifter arm 38 is provided with an up-turned free end portion 39 adapted to be engageable, when selectively positioned, with the dependent abutment means, constituted by a stud 24 and nut 25, of any given intake valve member with which it may be selectively aligned. A compression spring 40 is arranged about the actuator shaft 35 between the upper bearing portion 30 and the hub 37 of the lifter arm 38 to yieldably hold the shaft 35 and said lifter arm in normal initial lowered position. Affixed by its hub 41 to the upper exteriorly projecting end of said actuator shaft 35 is a knob 42 by means of which said shaft may be rotatably manipulated to selectively bring the lifter arm 38 into operative alignment with the valve member of any given intake valve means desired at a given time to be opened.

Affixed to an annular externally threaded boss 43 with which the top of the valve casing 10 is provided, and which is concentric to said actuator shaft 35, is a collar 44 having bearing ears 45 to support a fulcrum pin 46. Mounted on said fulcrum pin 46 as a fulcrum is the hub 47 of a toggle link member 48. The outer end portion of said toggle link member is bifurcated to provide a pair of arms 49 to straddle the actuator shaft 35. Loosely mounted on said actuator shaft 35 to abut the end of the knob hub 41 is a collar 50. This collar 50 is provided with oppositely and outwardly projecting recessed bearing bosses 51. A hand lever 52 having a bifurcated inner end portion to straddle said actuator shaft 35 is interconnected between said collar 50 and the arms 49 of said toggle link member 48, and to this end the bifurcated inner end portion of said hand lever is formed with upwardly extending ears 53 which carry trunnions 54 to engage in the recessed bearing bosses 51 of the collar 50, thus pivotally connecting said hand lever with the latter, while also said bifurcated inner end portion of the hand lever is further provided downwardly extending toggle arms 55, the free ends of which are pivotally coupled with the free ends of said toggle link member arms 49 by pivoting bolts 56.

Preferably the knob 42 of said actuator shaft 35 is provided with a peripheral depending skirt flange 57 in which are formed indented slots or notches 58 corresponding in number and angular spacing to the several intake valve means. By grasping and turning the knob 42, the actuator shaft 35 may be rotated to in turn revolve the valve lifter arms 38 to bring the same into operative alignment with any given intake valve means selected for operation. Preferably yieldable detent means is provided for holding the actuator shaft in any selected position to which it is moved. This detent means comprises a spring-pressed detent ball 59 carried by the collar 50 for cooperation with detent seats 60 with which the collar encircled portion of said actuator shaft is provided, and which correspond in number and relative spacing to the number and spacing of the several intake valve means. Whenever the actuator shaft is turned and the valve lifter arm 38 thereby selectively positioned relative to an intake valve means desired to be operated, a notch or slot 58 of the knob 42 will be aligned with and thus disposed to receive the hand lever 52, when the latter is up-swung. The knob notches or slots 58 may be numbered to correspond to the respective intake valve means, so that when a given notch or slot 58 is opposed to the hand lever 52 it will be indicated to the operator that the valve lifter arm 38 is operatively opposed to a corresponding intake valve means.

When the operator has rotated the actuator shaft 35 to turn the valve lifter arm 38 into operative alignment with the selected valve member 21 desired to be opened, he thereupon swings upwardly the hand lever 52 until it is stopped by the end of the knob slot 58 into which it enters, thus locking the knob 42 and actuator shaft 35 against rotative displacement or other manipulation while a given actuated valve remains open. As the hand lever 52 is up-swung, it turns about the trunnions 54 journaled in the collar 50, thereby swinging outwardly and downwardly the toggle arms 55, which being purchased by their pivotal connection with the toggle link member 48, likewise causes an accompanying upward and outward swinging movement of the latter about its fixed pivot 46. The resultant of these movements is an elongating expansion of the toggle arrangement provided by these parts, which operates to exert an upward thrust upon the collar 50, the movement of which is transmitted to the knob hub 41 which it abuts, so that the knob is lifted to in turn effect an upward sliding axial movement of the actuator shaft 35 (see Fig. 5). Such upward movement of the shaft 35 also carries upward the valve lift arm 38 against the valve member with which it has been previously aligned, thereby lifting said valve member off its seat and thus opening the served valve port 15 to the flow of liquid through the selected intake into the common valve casing chamber 11, to thence discharge through the outlet or spout 12 (see Fig. 6). The above described toggle arrangement is such that when the hand lever is swung to its upward limit, the toggle will swing slightly past dead center, and will thereupon thrust and hold the hand-lever in stopped relation to the end of the knob slot or notch 58 engaged thereby, so that the actuator shaft 35 will be locked in raised position against the tension of the spring 40 and the actuated valve member will likewise be locked in open position against the tension of its closing spring 26 until the operator manually pulls down the hand lever to return the parts to normal initial positions.

It will be obvious, from the above description, that the novel faucet or like valve provides a very simple multiple intake means subject to selective operation by an easily and quickly operable common actuating means. The novel structure is of particular advantage for use as a discharge faucet for compartment tank trucks.

In Figs. 7 and 8 I have shown a somewhat modified form of hand lever means for raising and lowering the rotatably adjustable actuator shaft 35. In this modified arrangement, the upper end of the shaft 35 is equipped with a simple knob 61 for turning the same. Affixed upon the threaded boss 43 is a collar 62 having up-standing bearing brackets 63 to support a fulcrum pin 46 upon which is pivoted a hand lever 64. The inner end portion of said hand lever is provided with a forked portion 65 to straddle the actuator shaft 35 and to operatively abut against the adjacent lower end of the hub 66 of the knob 61. Pivotally mounted in connection with the hand lever 64 is a latch pawl 67, to the upper arm 68 of which is connected a depressible release rod 69 which extends slidably outward through the free end portion of said hand lever, and which terminates in a diametrically enlarged push button 70, which projects externally from the extremity of said hand lever. Said push button 70 is longitudinally movable in a slideway cavity 71 with which the outer end portion of the hand lever is provided, and a compression spring 72 is arranged about the release rod 69 between the inner end of said slideway cavity 71 and said push button 70. Said spring serves yieldably to hold the latch pawl in operative position. Formed in connection with the bearing brackets 63 is a latch nosing 73 adapted to be engaged, at proper times, by said latch pawl.

Suitably affixed to the collar 62 is an index or dial plate 74 having designations corresponding in position to the several intake valve members of the device. Affixed to said actuator shaft 35 is an index hand or pointer 75 which cooperates with the index or dial plate 74.

In use, the last above described modified form of hand lever means operates as follows. After the actuator shaft 35 has been rotatably adjusted to align the valve arm 38 with an intake valve means selected for operation, the operator swings downward the hand lever 64, thereby causing its forked inner end 65 to exert uplifting pressure upon the knob 61—66 thus sliding upward the actuator shaft 35 to open the selected intake valve means. As the hand lever reaches its lower limit of swing, the latch pawl 67 will snap over the latch nosing 73, thus holding down the hand lever to retain the actuator shaft uplifted and the operated intake valve means in open position. When it is desired to close the operated intake valve means, the operator presses the push-button 70 to slide inward the release rod 69, whereby the latch-pawl 67 is swung outward to disengage the latch nosing 73 so that the hand lever, actuator shaft and operated intake valve means may all be returned to normal initial positions.

It will be understood that various changes could be made in the construction and arrangement of the various parts and elements of the mechanisms above described without departing from the spirit of this invention within the scope of the appended claims. It is therefore intended that all matter contained in the above description or shown in the accompanying drawings shall be interpreted as illustrative and not in a limiting sense.

I claim:—

1. In a selective multiple faucet or like valve, a casing having in its upper portion a plurality of intake chambers symmetrically disposed about its vertical axis and in its lower portion a discharge chamber into which said intake chambers open through valve ports with which the same are provided, valve members for normally closing the ports of the respective intake chambers, an actuator shaft axially mounted in connection with said casing subject to both rotative and axial sliding movements, a valve operating means carried by said shaft and movable upon rotation of the latter into operative aligned relation to any intake valve member selected to be opened, means connected with the upper exteriorly projecting end portion of said shaft for imparting rotative movement thereto, and means cooperative with said exterior portion of said shaft for producing axial sliding movement thereof.

2. In a selective multiple faucet or like valve, a casing having in its upper portion a plurality of intake chambers symmetrically disposed about its vertical axis and in its lower portion a discharge chamber into which said intake chambers open through valve ports with which the same are provided, spring pressed valve members for normally closing the ports of the respective intake chambers, an actuator shaft axially mounted in connection with said casing subject to both rotative and axial sliding movement, the lower end portion of said shaft extending into said discharge chamber beneath said intake chambers, a valve lifter arm affixed to said lower end portion of said shaft and movable by rotation of the latter into operative aligned relation to any intake valve member selected to be opened, said casing having a stuffing-box means through which the upper end portion of said shaft exteriorly projects, means connected with the exterior end portion of said shaft for imparting rotative movement thereto, and means cooperative with the exterior end portion of said shaft for producing axial sliding movement thereof.

3. In a selective multiple faucet or like valve, a casing having in its upper portion a plurality of intake chambers symmetrically disposed about its vertical axis and in its lower portion a discharge chamber into which said intake chambers open through valve ports with which the same are provided, spring pressed valve members for normally closing the ports of the respective intake chambers, an actuator shaft axially mounted in connection with said casing subject to both rotative and axial sliding movement, the lower end portion of said shaft extending into said discharge chamber beneath said intake chambers, a valve lifter arm affixed to said lower end portion of said shaft and movable by rotation of the latter into operative aligned relation to any intake valve member selected to be opened, said casing having a stuffing-box means through which the upper end portion of said shaft exteriorly projects, a knob on the exterior end portion of said shaft for rotating the same, and a pivoted manipulatable hand lever means having means cooperative with said knob for imparting axial sliding movement to said shaft.

4. In a selective multiple faucet or like valve as defined in claim 3, wherein a yieldable detent means is provided in connection with said shaft for determining the operative stations to which the same and the valve lifter arm thereof may be adjusted by rotation thereof, and index means for indicating said station positions.

5. In a selective multiple faucet or like valve as defined in claim 3, wherein index means is provided for indicating the operative stations to which the actuator shaft and the valve lifter arm thereof may be adjusted by rotation of said shaft.

6. In a selective multiple faucet or like valve as defined in claim 3, wherein means is provided for retaining the actuator shaft, as uplifted by said hand lever means, in an intake valve member operating position.

7. In a selective multiple faucet or like valve, a casing having in its upper portion a plurality of intake chambers symmetrically disposed about its vertical axis and in its lower portion a discharge chamber into which said intake chambers open through valve ports with which the same are provided, spring pressed valve members for normally closing the ports of the respective intake chambers, an actuator shaft axially mounted in connection with said casing subject to both rotative and axial sliding movement, the lower end portion of said shaft extending into said discharge chamber beneath said intake chambers, a valve lifter arm affixed to said lower end portion of said shaft and movable by rotation of the latter into operative aligned relation to any intake valve member selected to be opened, the upper end of said shaft extending exteriorly of said casing, a knob on the exterior end of said shaft for rotating the same, a toggle lever means mounted between said knob and the casing, and a hand lever for actuating said toggle lever means to produce thereby uplifting sliding movement of said shaft and its valve lifter arm.

8. In a selective multiple faucet or like valve, a casing having in its upper portion a plurality of intake chambers symmetrically disposed about its vertical axis and in its lower portion a discharge chamber into which said intake chambers open through valve ports with which the same are provided, spring pressed valve members for normally closing the ports of the respective intake chambers, an actuator shaft axially mounted in connection with said casing subject to both rotative and axial sliding movement, the lower end portion of said shaft extending into said discharge chamber beneath said intake chambers, a valve lifter arm affixed to said lower end portion of said shaft and movable by rotation of the latter into operative aligned relation to any intake valve member selected to be opened, the upper end of said shaft extending exteriorly of said casing, a knob on the exterior end of said shaft for rotating the same, a toggle lever means mounted between said knob and the casing, a hand lever for actuating said toggle lever means to produce thereby uplifting sliding movement of said shaft and its valve lifter arm, and said knob including stop means to engage the manipulated hand lever to hold the same in operated position and thereby retain the toggle lever means expanded to in turn retain said shaft and valve lifter arm in upraised selected intake valve member opening position.

9. In a selective multiple faucet or like valve, a casing having in its upper portion a plurality of intake chambers symmetrically disposed about its vertical axis and in its lower portion a discharge chamber into which said intake chambers open through valve ports with which the same are provided, spring pressed valve members for normally closing the ports of the respective intake chambers, an actuator shaft axially mounted in connection with said casing subject to both rotative and axial sliding movement, the lower end portion of said shaft extending into said discharge chamber beneath said intake chambers, a valve lifter arm affixed to said lower end portion of said shaft and movable by rotation of the latter into operative aligned relation to any intake valve member selected to be opened, the upper end of said shaft extending exteriorly of said casing, a knob on the exterior end of said shaft for rotating the same, a toggle lever means mounted between said knob and the casing, a hand lever for actuating said toggle lever means to produce thereby uplifting sliding movement of said shaft and its valve lifter arm, and said knob including stop means to engage the manipulated hand lever to hold the same in operated position and thereby retain the toggle lever means expanded to in turn retain said shaft and valve lifter arm in upraised selected intake valve member opening position, said stop means comprising indented notches in the peripheral portions of the knob within which the manipulated hand lever is received, whereby such engagement also locks the knob and shaft against rotative movement.

10. In a selective multiple faucet or like valve as defined in claim 7, wherein a yieldable detent means is provided in connection with said shaft for determining the operative stations to which the same and the valve lifter arm thereof may be adjusted by rotation thereof, and an index means for indicating said station positions.

ABRAM W. WHEATON.